INVENTOR
M. H. CROWELL
BY
R. B. Anderson
ATTORNEY 3,401,299

VIDEO STORAGE TUBE

Merton H. Crowell, Morristown, N.J., assignor to Bell Telephone Laboratories, Incorporated, Murray Hill and Berkeley Heights, N.J., a corporation of New York Filed July 14, 1966, Ser. No. 565,285
11 Claims. (Cl. 315—12)

This invention relates to cathode ray storage tubes used in conjunction with conventional display tubes for giving repeated reproductions of transmitted television images.

One limitation of television transmission systems, especially telephone-television systems in which video signals are sent by transmission line, is the large bandwidth presently required for each channel of transmission. The required bandwidth is a function of the system frame rate; that is, the number of images to be reproduced per unit of time. If the frame rate were reduced, a smaller bandwidth would be required for each channel, which would effectively increase the number of channels that could be accommodated by the transmission system. It has been observed, however, that a frame rate of 60 frames per second is usually required for giving a satisfactory picture reproduction free of noticeable light pulsations known as flicker. It has also been observed that only about 15 frames per second are required for reasonably accurate animation, at least for scenes typically transmitted by telephone-television systems. Hence, if images were transmitted at 15 frames per second, with each image being reproduced four times, the bandwidth requirements could be substantially reduced, and flicker would be avoided because reproduction would occur at 60 frames per second.

Repeated image reproductions require a device for storing each frame. For example, if each new frame is transmitted in a time interval of $\frac{1}{60}$ second with a $\frac{1}{60}$ second time interval between each new frame, the displayed frame rate can be doubled by both displaying and storing each incoming frame. During the time interval between transmitted frames, the stored frame can be displayed; this technique doubles the frame rate of the displayed information. If the storage device is capable of "non-destructive read-out" each stored frame can be displayed several times for further increasing the frame rate. A non-destructive read-out storage tube would, of course, permit a 60 frame per second read-out from a 15 frame per second transmission system by reading each frame four times.

Unfortunately, none of the storage devices presently commercially available gives a sufficiently non-destructive read-out. Each successive read-out degrades the image stored in the device; usually the light contrast is reduced with each reproduction of a stored image.

Accordingly, an object of this invention is an improved non-destructive read-out type video storage device.

This and other objects of the invention are attained in an illustrative embodiment thereof comprising a cathode ray storage tube having a thin storage film bonded to a conductive backplate. A conventional electron gun and deflection structure are included in the tube for electron beam scanning of a target surface of the storage film. As will be discussed more fully later, a voltage pattern representative of a frame or image is impressed on the target surface of the storage film either by scanning the film with a modulated electron beam or by using a photoconductive storage film which is excited optically by the image.

The stored image is read out from the tube by scanning the target surface with the electron beam. One characteristic of the film is that the number of secondary electrons emitted in response to electron bombardment is a function of the stored voltage. Hence, a signal representation of the image can be derived either by collecting the secondary electrons or by detecting the high frequency voltage changes on the conductive backplate that occur in response to the variations in secondary emission. As will be described later, two storage tubes can be used in conjunction with each television receiver. One frame is recorded on one storage tube during the time interval in which several frames are derived from the other storage tube.

In accordance with my invention, the read-out of the storage tube is substantially non-destructive because the conductive backplate is energized with direct current that "leaks" from the bonded surface of the storage film to the target surface to reinforce the original voltage on each target surface increment after it has been scanned by the electron beam. The storage film is thinner than the minimum spatial wavelength of the target voltage pattern so as to permit these leakage currents from the backplate to the target surface while maintaining the potential differences along the target surface that define the voltage pattern. As will be described more fully later, the time constants of the electron beam current path and the leakage current path, the secondary emission ratio, and the frame and scan rate of the electron beam are appropriately adjusted to maintain a dynamic balance between the currents leaving the target surface and those entering the target surface. The voltage pattern can be erased simply by changing the bias voltage of the conductive backplate and then scanning the target with the electron beam.

These and other objects and features of the invention will be better appreciated from a consideration of the following detailed description taken in conjunction with the accompanying drawing, in which.

Figure 1:
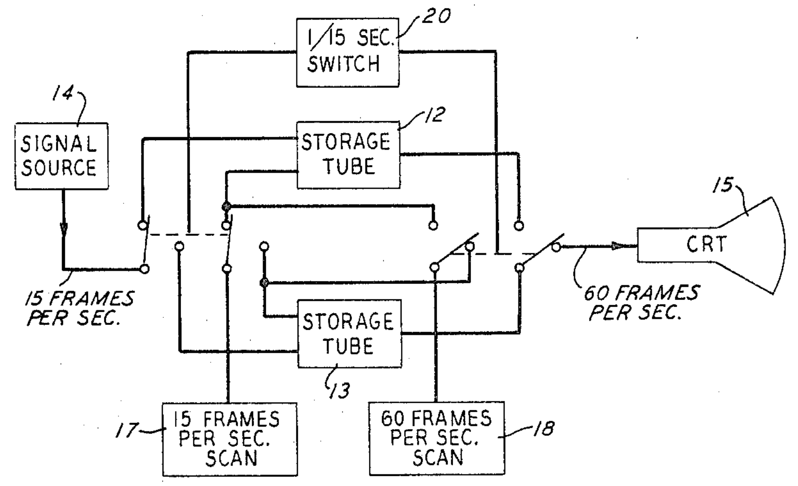
FIG. 1 is a schematic diagram of a television receiver station utilizing storage tubes in accordance with an illustrative embodiment of the invention.

Referring now to FIG. 1, there is shown, for illustrative purposes, a television receiving station comprising two video storage tubes 12 and 13 of the kind to be discussed in detail below for converting a 15-frame per second video signal from a source 14 to a 60-frame per second signal for display by conventional cathode ray television tube 15. An input circuit to each tube includes the signal source 14 and a 15-frame per second deflection control device 17. An output circuit for each tube comprises the cathode ray tube 15 and a 60-frame per second deflection control device 18. The storage tubes are switched between the input and output circuits each one-fifteenth of a second by a switch control 20, such that while one of the storage tubes is connected to the output circuit the other is connected to the input circuit.

In the condition shown in FIG. 1, the storage tube 12 is connected to the input circuit and the storage tube 13 is connected to the output circuit. During the one-fifteenth second switching interval, a single frame is recorded in storage tube 12, and simultaneously, four frames of an image stored in tube 13 are read out from tube 13 and successively displayed by display tube 15. By displaying images at a 60-frame per second rate, through appropriate adjustment of the scan mechanism, flicker is avoided, even though the source 14 transmits signals at only a 15-frame per second rate.

Figures 2, 3:
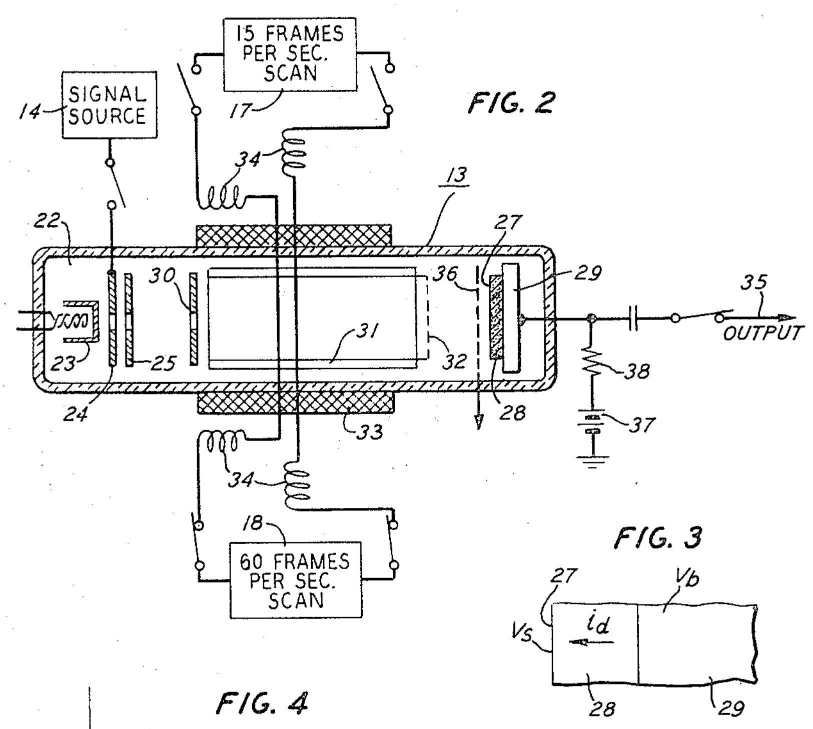
FIG. 2 is a schematic diagram of a cathode ray video storage tube in accordance with one embodiment of the invention.
FIG. 3 is a schematic sectional view of part of the storage tube of FIG. 2.

Referring now to the schematic illustration of FIG. 2, the storage tube 13 comprises an electron gun 22 including a cathode 23, control grid 24, and accelerating anode 25 for forming and projecting an electron beam toward a target surface 27 of a storage film 28 bonded to a conductive backplate 29. The electron beam is projected from the gun through a beam forming aperture 30, a drift tube 31, and a de-accelerating grid 32. The beam is focused by a cylindrical magnet 33 and deflected vertically and horizontally in a conventional manner by deflection coils 34 shown schematically.

When switched as shown, the deflection coils 34 are connected to the 60-frame per second deflection control circuit 18 while the backplate 29 is connected to an output lead 35 which modulates the beam of the cathode ray display tube of FIG. 1. When the tube is switched to connection with the input circuit, signal source 14 modulates the electron beam with signal energy while the 15-frame per second deflection control 17 causes the beam to scan target surface 27 to impress a voltage pattern indicative of one transmitted frame. The voltage pattern recorded on target surface 28 is defined by areas of varying potential difference caused by different current densitives of the modulated electron beam.

During read-out, the unmodulated beam scanning the target surface drives secondary electrons from each incremental area as a function of the storage voltage at that area, the secondarily emitted electrons being collected by a collecting grid 36. The secondary electron emission characteristic is substantially linear at most operating voltages; preferably it is linear over the entire dynamic range, that is, the range of voltages at which the beam impinges on the target surface. Differences of secondary emission as the beam scans the storage film 28 are manifested as high frequency voltage variations in the conductive backplate 29 which are capacitively coupled to the output connection 35. The high frequency voltages on the output connection 35 are used to modulate the beam of the cathode ray tube 15 of FIG. 3 as it scans at the same 60-frame per second rate that is used for read-out from the storage tube 13. Alternatively, the reading output could be taken from the secondary electron collecting grid 36 since the currents taken from this grid are also indicative of the stored voltage pattern.

In the absence of any further modfification, scanning of the target surface 27 by the electron beam would either erase the stored voltage pattern or substantially degrade it. In accordance with the principles of my invention, however, the conductive backplate 29 is biased by a D-C source 37 through a load resistor 38 at a voltage which is adjusted with respect to the various parameters of the tube to reinforce the voltages on the various incremental areas of target surface 27 after they have been impinged by the electron beam. Consider a sample 27' of target surface 27 shown in FIG. 3 on which is stored a voltage $V_s$. Assuming that the secondary emission ratio of the target surface is less than 1, the impinging electron beam will reduce the voltage $S_s$ during reading by an amount $\Delta V_s$ and therefore cause an additional leakage current $\Delta i_d$ to flow from the backplate 29 to the target surface 27 as shown. With proper adjustment of parameters, this current will be just sufficient to raise the voltage of the sample target surface to its original value by the time the electron beam makes its next successive impingement.

Figure 4:
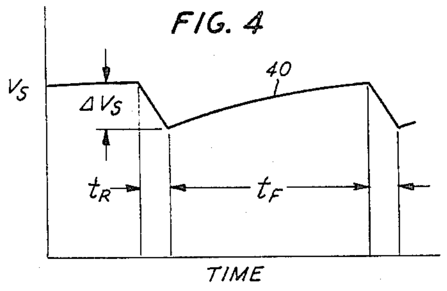
FIG. 4 is a graph of stored voltage versus time on the segment shown in FIG. 3.

This mechanism is shown in FIG. 4 in which the curve 40 represents the change of the target voltage $V_s$ with respect to time. During the time $t_R$ at which the beam impinges on the incremental target area, the voltage $V_s$ is reduced by the amount $\Delta V_s$. Current $\Delta i_d$ then reinforces the voltage $V_s$ during time $t_F$ at which the target area is not exposed to the electron beam, such that at the time of the next succeeding impingement the voltage $V_s$ has been raised to its initial value. Hence, a large number of successive read-outs can be taken from a single stored signal and the storage tube can be considered non-destructive.

It can be appreciated that correct operation of the device requires a careful control of $i_d$ so that it reinforces $V_s$ to its original value but no more, in the period between beam impingements. First, consider the film thickness to offer a certain resistance and capacitance to the leakage current $i_d$, in which case the film thickness has a time constant $\tau_t$. Next, consider the electron beam as defining a conductive path between the cathode 23 and the backplate 29 which also has a resistance and therefore this beam resistance in combination with the target resistance and capacitance creates a time constant $\tau_b$ associated with read-out. As will be explained more fully later, accurate voltage reinforcement over the dynamic range of surface voltages can be attained if the ratio of the time constant associated with read-out to the film thickness time constant is given by, $$\frac{\tau_b}{\tau_t}=\frac{t_R}{t_F} \qquad (1)$$

The target time constant $\tau_t$ may be defined as $$\tau_t=\rho\epsilon_1\epsilon_0=\frac{\epsilon_1\epsilon_0}{d\sigma_t} \qquad (2)$$

where $\rho$ is the volume resistivity of the storage film, $\epsilon_1\epsilon_0$ is the dielectric constant of the storage film, $d$ is the storage film thickness, and $\sigma_t$ is the storage film conductance per unit of area. $\tau_b$ may be defined as $$\tau_b=\frac{\epsilon_1\epsilon_0}{d(\sigma_b-\sigma_t)} \qquad (3)$$

where $\sigma_b$ is the beam conductance per unit of area which is explicitly defined by Equation 11 infra.

While the film 28 must be sufficiently conductive to permit a leakage current $i_d$ as illustrated by the charging curve in FIG. 4, it must also be sufficiently insulative to maintain, at least temporarily, the potential differences on the target surface that define the stored voltage pattern. These two requirements can be met concurrently if the thickness of film 28 between backplate 29 and target surface 27 is smaller than the distance between periodic potential differences on the target surface. In effect, the resistance across the thickness of the film should be smaller than the lateral resistance between adjacent regions between which voltage differences are desired to be resolved. This criterion can be best expressed in terms of $\lambda$, the minimum spatial wavelength of the stored voltage pattern on the target surface, $$\frac{\lambda}{2\pi}>d \qquad (4)$$

where $d$ is the thickness of film 28.

Consider next the optimum direct current voltage at which the backplate 29 should be biased. If the resistance of film 28 to the leakage currents is substantially linear, the optimum backplate bias voltage $V_0'$ can be determined from the graph of FIG. 5, in which curve 42 is the secondary emission ratio versus target surface voltage characteristic of the storage film 28. As mentioned before, part of characteristic 42 is linear with the center of the dynamic range of stored target voltages $V_{so}$ preferably being located in the center of the linear portion of the curve. A typical dynamic range R of stored target voltages is also indicated on FIG. 5. The optimum backplate bias voltage $V_0'$ is taken as that voltage at which a tangent 43 to the linear portion of curve 42 intersects a line 44 at which the secondary emission ratio equals 1.0. It is not always necessary that the bias voltage be at the optimum value $V_0'$ since an infinite number of read-outs are not made, and ordinarily, some degradation with each successive read-out can be tolerated.

Figure 6:
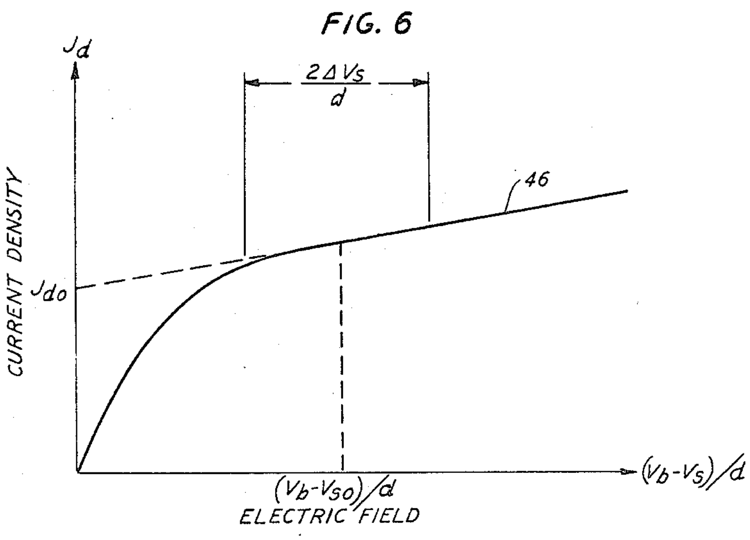
FIG. 6 is a graph of storage film current density versus storage film electric field in a device of the type shown in FIG. 2 when operated under certain conditions.

If the resistance of the film 27 is not linear, then the optimum bias voltage can be determined by equations given below in conjunction with the graph of FIG. 6 in which curve 46 represents the variation of the current density $J_d$ of the leakage current $i_d$ in the film with respect to the electric field across the film. $J_{do}$ is the point on the coordinate $J_d$ intersected by the tangent to the linear portion of curve 46. If the secondary emission ratio of the film is less than 1, and its resistance is nonlinear, then the optimum bias voltage $V_b'$ can be determined by, $$V_b' = V_{so} - \frac{J_{bo}}{\sigma_b} - \frac{J_{do}}{\sigma_t} \quad (5)$$

where $J_{bo}$ is the electron beam current density factor which will be defined in the detailed analysis to follow. If the resistance is nonlinear and the secondary emission ratio is greater than 1, then the optimum backplate bias voltage $V_b''$ is given by the relationship, $$V_b'' = V_{so} - \frac{J_{bo}}{\sigma_b} + \frac{J_{do}}{\sigma_t} \quad (6)$$

The derivation of these equations will be given below in the detailed analysis.

Figure 7:
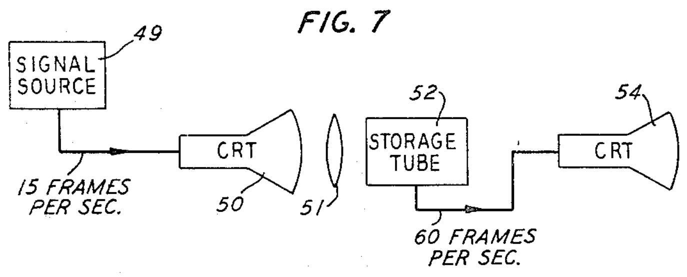
FIG. 7 is a schematic view of a television receiving station utilizing storage tubes in accordance with another embodiment of the invention.

Referring now to the station of FIG. 7, signal energy at 15 frames per second from a source 49 is transmitted to and displayed by a conventional cathode ray display tube 50. Each displayed frame is imaged by a lens 51 onto a video storage tube 52 of the kind to be described below, where it is recorded. The image or frame stored in the storage tube 52 is then read out at a 60-frame per second rate and displayed by a cathode ray tube 54. As before, each stored frame is read out four times to give the desired multiplication of frame rate.

Figure 8:
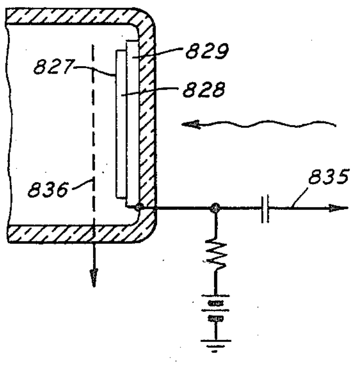
FIG. 8 is a schematic view of part of a video storage tube in accordance with the embodiment of FIG. 7.

Storage tube 52 operates in the same way as the storage tube of FIG. 2 except that each image is recorded optically rather than by a scanning electron beam. Referring to FIG. 8, the conductive backplate 829 of storage tube 52 is made substantially transparent to the light to be recorded, while storage film 827 is made of a photoconductive material. By a mechanism which is well understood in the art, the light energy impinging on photoconductive storage film 828 induces voltages on the target surface 827 in accordance with the variable intensity of the light. The stored voltage pattern is then read out by a scanning electron beam at 60-frames per second in the same manner as in the device of FIG. 2. Accordingly, the remaining tube structure, which is identical with that of FIG. 2, has not been shown. As before, the read-out video signal is taken from an output line 835 connected to the transparent conductive backplate 829, although it could alternatively be taken from the secondary electron collector 836.

The conductive backplate 829 may be a film of tin oxide approximately 6000 angstroms thick, giving a resistance on the order of 1 ohm per square inch, but still being substantially transparent. The photoconductor storage surface may be doped antimony trisulfide ($SbS_3$) or doped cadmium sulfide (CdS) of the kind employed in vidicon tubes. Other relevant tube parameters which may typically be used for giving a 60-frame per second read-out from a 15-frame per second record cycle are as follows: beam current, 10 microamperes; output current, 1 microampere; storage film thickness, 2500 angstroms; storage film resistivity, $4\times10^{10}$ ohm-centimeters; signal to noise ratio, 55 decibels. For the beam recording embodiment of FIG. 2, the storage film 28 is preferably cadmium sulfide, although antimony trisulfide or other materials can alternatively be used.

While the foregoing discussion gives the criteria for construction and operation of a video storage tube in accordance with the invention, along with specific illustrative examples, the following detailed analysis is also presented for clarifying the derivation of these criteria and for giving a theoretical explanation of tube operation which will be of aid to those skilled in the art desiring to make modified embodiments of the invention for use in different systems having different requirements.

*Detailed analysis*

The writing or recording operation is assumed to produce a voltage profile on the target surface, $V_s$, that may be written as $$V_s(x,y) = V_{so} + f(x,y) \quad (7)$$

where the coordinates $(x,y)$ specify a particular location on the storage surface and the maximum magnitude of $f(x,y)$ is much less than $V_{so}$, the center of the dynamic range of target voltage (e.g., $|f(x,y)|_{max} \approx 5$ volts).

Satisfactory tube performance requires that the secondary emission ratio $\delta$ of the film 28 or 828 be linearly dependent upon bombarding voltage throughout the dynamic range of surface voltage. That is, $$\delta = \delta_o + K(V_s - V_{so})$$

for $$V_{so} - |f(x,y)|_{max} < V_s < V_{so} + |f(x,y)|_{max} \quad (8)$$

Equation 8 is merely a Taylor Series expansion about the voltage $V_s = V_{so}$. Throughout the following analysis it will be assumed that the area of the beam cross section is independent of bombarding energy and that the beam current density is a constant within this cross section. The proportionality constant, K, in Equation 8 is typically of the order $(100 \text{ volts})^{-1}$, and the bombarding voltage that produces a $\delta$ of unity, is between 20 to 100 volts. Furthermore, any crosstalk between picture elements due to secondary electron redistribution will be neglected. This is a reasonable assumption as long as the dynamic range of the voltage profile on the target surface is less than 2 volts.

The effective charging current density produced by the electron beam, $J_c$, may be written as $$J_c = I_b A^{-1}[\delta_o - 1 + K(V_s - V_{so})] \text{ amp/m.}^2 \quad (9)$$

where $I_b$=beam current (amp) (i.e., $I_b>0$)
$A$=beam cross section (m.$^2$)

This charging current may be expressed as a current density flowing through a fictitious film as $$J_c = \delta_b(V_s - V_{so}) + J_{bo} \quad (10)$$

where $$\delta_b = I_b A^{-1} K \text{ mho/m.}^2 \quad (11)$$

and $$J_{bo} = I_b A^{-1}(\delta_o - 1) \quad (12)$$

$J_{bo}$ is referred to herein as the electron beam current density factor.

The leakage current that flows to the target surface through the target film from the backplate may be written as $$J_d = J_{do} + (V_b - V_s)(\rho d)^{-1} = J_{do} + \sigma_t(V_b - V_s) \quad \text{for } |V_b - V_{so}| < \Delta V_s \quad (13)$$

where $V_b$=backplate voltage
$\rho$=volume resistivity of the film (ohm-m.)
$d$=film thickness (m.)
$\sigma_t$=film conductance per unit area (mho/m.$^2$
$J_{do}$=the extrapolated current density factor when $V_b - V_s = 0$ Since the current dependence upon electric field is nonlinear in many insulators and photoconductors, it is necessary to include the term $J_{do}$. When $V_b - V_s > 0$, $J_{do} > 0$. This is illustrated in FIG. 6.

It will be assumed that the electron beam will read a particular target area for a period equal to $t_R$ seconds once during the period of each frame. Furthermore, it will be assumed that the period between read-outs (i.e., between reading intervals) will be equal to $t_F$ so that the period of a complete frame is $t_R + t_F$ as shown in FIG. 4. During the time the beam is reading a particular site, the total current density flowing to that site may be obtained from Equations 10 and 13 as $$J_t = \sigma_b(V_s - V_{so}) + J_{bo} + \sigma_t(V_b - V_s) + J_{do} \text{ for } 0 \leq t \leq t_R \quad (14)$$

Thus, if the dielectric constant of the film is equal to $\epsilon_1\epsilon_0$, the voltage of the target may be written as $$\frac{dV_s}{dt} = d(\epsilon_1\epsilon_o)^{-1}[V_s(\sigma_b - \sigma_t) + \sigma_t V_b - \sigma_b V_{so} + J_{bo} + J_{do}] \quad (15)$$

Equation 15 may be solved with the initial condition that $V_s(0) = V_a$ to yield $$V_s(t) = V_a \exp(t/\tau_b) + \left\{\frac{\sigma_t V_b - \sigma_b V_{so} + J_{bo} + J_{do}}{\sigma_b - \sigma_t}\right\}\{\exp(t/\tau_b) - 1\} \text{ for } 0 < t < t_r \quad (16)$$

where $\tau_b$ is a time constant associated with the fictitious beam conductance and the capacitance of the storage surface and is defined as, $$\tau_b = \frac{\epsilon_1\epsilon_0}{d(\sigma_b - \sigma_t)} \quad (17)$$

During the interval between successive reading operations, the target voltage will discharge (or charge) toward the backplate voltage due to the finite conductivity of the film. At the beginning of the second reading period, the voltage may be found with the aid of Equation 13 as $$V_s(t_R + t_F) = [V_s(t_R) - V_b - J_{do}/\sigma_t]\exp - (t_F/\tau_t) + V_b + J_{do}/\sigma_t \quad (18)$$

where $\tau_t$ is time constant associated with the film and is defined as $$\tau_t = \rho\epsilon_1\epsilon_0 = \frac{\epsilon_1\epsilon_0}{d\sigma_t} \quad (19)$$

In order that the target potential at the beginning of each reading operation remain unchanged from frame to frame, it is necessary that $$V_s(0) = V_s(t_R + t_F) \quad (20)$$

The tube parameters that will produce an equilibrium reading operation may be obtained by substituting Equations 16 and 18 into Equation 20. This yields $$V_a = V_a \exp[t_R/\tau_b - t_F/\tau_t] + \left\{\frac{\sigma_t V_b' - \sigma_b V_{so} + J_{bo} + J_{do}}{\sigma_b - \sigma_t}\right\}\{\exp[t_R/\tau_b - t_F/\tau_t] - \exp - (t_F/\tau t)\} + \{V_b' + J_{do}/\sigma_t\}\{1 - \exp - (t_F/\tau_t)\} \quad (21)$$

where the prime on $V_b$ indicates the particular value of $V_b$ that produces the equilibrium condition. In order to insure that Equation 21 holds for all values of $V_a$ within the range specified by Equation 8, it is necessary that $$t_R/\tau_b = t_F/\tau_t \quad (22)$$

In an operating tube, Equation 22 could be satisfied by adjusting the beam current. Substituting the restriction stated in Equation 22 into Equation 21 yields $$\left\{\frac{\sigma_b(V_b' - V_{so}) + J_{bo} + J_{do}\sigma_b/\sigma_t}{\sigma_b - \sigma_t}\right\}\{1 - \exp t_F/\tau_t\} = 0 \quad (23)$$

or the value of backplate voltage $V_b'$, that produces the equilibrium reading operation is $$V_b' = V_{so} - J_{bo}/\sigma_b - J_{do}/\sigma_t \text{ for } V_s < V_o \quad (24)$$

where $V_o$ is the surface voltage at which the secondary emission ratio is equal to 1. The range of validity for Equation 24 is restricted to $V_s < V_o$ since the leakage current is represented by Equation 13. It can be shown that if the center of the dynamic range is greater than $V_o$, then the optimum backplate voltage can be determined from an equation similar to Equation 24 as $$V_b'' = V_{so} - J_{bo}/\sigma_b + J_{do}/\sigma_t \text{ for } V_s > V_o \quad (25)$$

where the double prime indicates that the equation is valid for $V_s > V_o$. Thus, Equations 24 and 25 are identical if $J_{do} = 0$.

Figure 9:
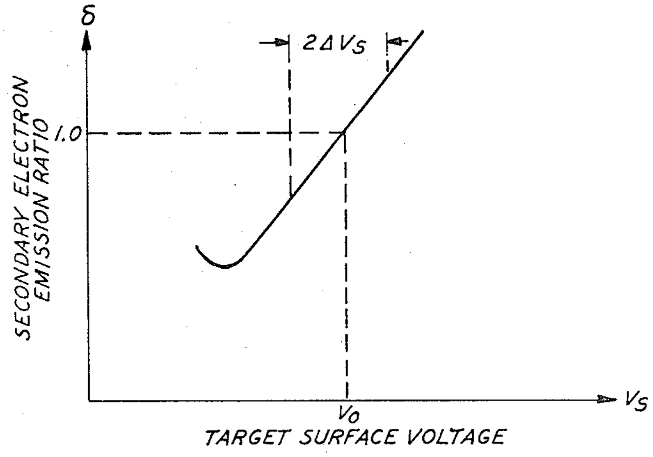
FIG. 9 is a graph of secondary emission ratio versus target surface voltage in a device of the type shown in FIG. 2 when operated under certain conditions.

The physical interpretation of Equation 24 is straightforward if the secondary emission ratio of the film is similar to the relationship illustrated in FIG. 9, (i.e., if the slope of the $\delta$ versus $V_s$ curve may be approximated as a straight line when it passes through the voltage that produces $\delta = 1$) and $J_{do} = 0$. Thus, if the storage tube is operated so that the dynamic range of the target voltage includes the voltage $V_0$ where $\delta(V_0) = 1$, then Equation 8 can be written as $$\delta = 1 + K'(V_s - V_o) \text{ for } |V_s - V_o| < \Delta V_s \quad (26)$$

The parameter $\Delta V_s$ represents one-half of the dynamic voltage range.

Equation 8 reveals $\delta_o$ is equal to unity when $V_{so} = V_o$. Substituting this value of $\delta_o$ into Equation 24 yields $J_{bo} = 0$. Therefore, if the backplate voltage is adjusted so that it is equal to $V_o$ and if the insulating film provides a constant value of resistance (i.e., $J_{do} = 0$), Equations 22 and 24 predict that the electronic charge that leaks through the dielectric during the frame interval, $t_F$, will be replaced by the electron beam during the read interval, $t_R$. It should be noted that this dynamic equilibrium condition exists over the entire range of surface voltages that satisfy Equation 8.

Figure 5:
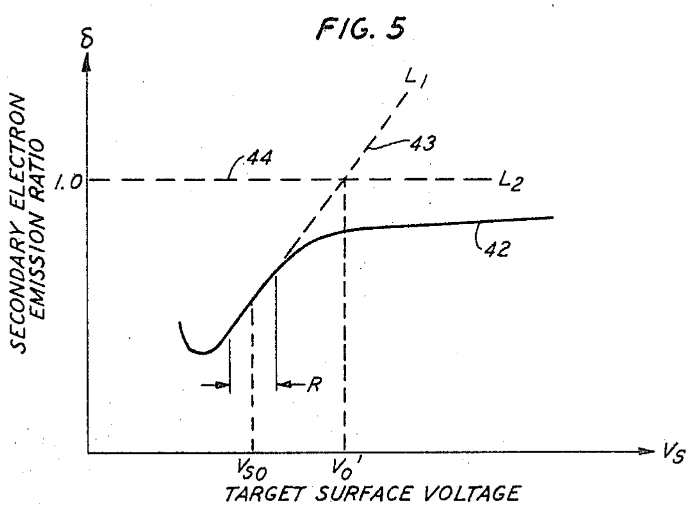
FIG. 5 is a graph of secondary emission ratio versus target surface voltage in the device of the type shown in FIG. 2 when operated under certain conditions.

It is instructive to consider the case in which the secondary emission ratio varies as shown in FIG. 5 and the film resistance is a constant (i.e., $J_{do} = 0$). It will be demonstrated that a dynamic equilibrium condition exists even though the secondary emission ratio is always less than unity. For this example, the center of the dynamic range of the surface voltage is centered at $V_{so}$ as indicated in FIG. 5. In the range of surface voltages given in the figure, it is assumed that $\delta$ is determined from Equation 8 and $J_{do} = 0$. Thus, Equation 24 reduces to $$V_b' = V_{so} - J_{bo}/\sigma_b \quad (27)$$

where $J_{bo}/\sigma_b$ may be evaluated from Equations 11 and 12 as $$J_{bo}/\sigma_b = (\delta_o - 1)/K \quad (28)$$

Substituting Equation 28 into 27 yields $$V_b' = V_{so} + (1 - \delta_o)/K \quad (29)$$

An examination of Equation 29 and FIG. 5 reveals that the optimum target voltage, $V_b'$, is equal to value $V_o'$ which is voltage that corresponds to the intersection of the lines 43 and 44. The line 43 is a straight line that is tangent to secondary emission ratio curve at the point $V_{so}$, and the line 44 corresponds to the line that is represented by the equation $\delta = 1$.

This result is intuitively clear from the results obtained for the first example when the dependence of secondary emission ratio was expressed as in Equation 8. Under this restriction it was demonstrated that all values of surface voltages within the dynamic range of Equation 8 represented points that would remain in dynamic equilibrium. Thus, if the voltage profile were restricted to a very small part of this dynamic range, as illustrated in FIG. 5, and the voltage profile did not vary outside of this range during the frame period, $t_F$, then the actual values of the secondary emission ratio outside of the dynamic range would be immaterial to stability of the voltage profile. Thus, it is clear that if the secondary emission ratio is linear over some range of voltage and if it has a positive slope in this range, then there is an optimum value for the target voltage that will provide an equilibrium reading condition.

Returning to Equation 24, it is quite evident that the effect of the constant leakage term merely reduces the optimum target voltage from $V_o$ to $V_o-J_{do}/\sigma_t$ when $V_{so}<V_o$ or increases it from $V_o$ to $V_o+J_{do}/\sigma_t$ when $V_{so}>V_o$.

The analysis thus far demonstrates that it is possible to maintain a given voltage profile over the target surface. Next, consider two techniques for recording with an electron beam (i.e., for obtaining the desired voltage pattern).

One technique is to use the recording technique used in the more conventional frame repeating tubes. That is, first the previously stored information is erased by discharging the surface to some predetermined voltage, usually cathode voltage. The new information is recorded after the surface potential is raised to some voltage that produces a secondary emission ratio greater than unity. A new voltage profile is obtained by varying the beam current as the target area is scanned. This technique is time consuming since the old information must be erased by charging the storage surface to an equilibrium point.

Figure 10:
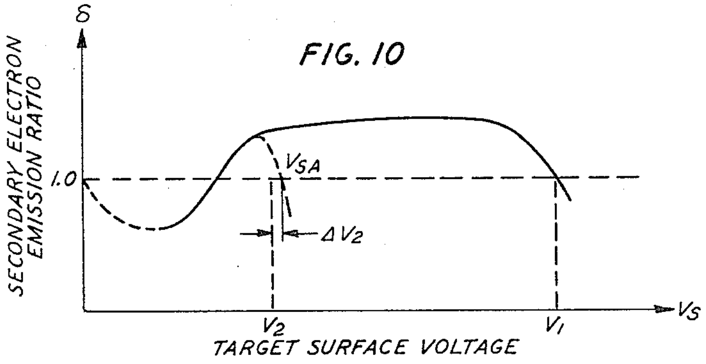
FIG. 10 is a graph of secondary emission ratio versus target surface voltage in a device of the type shown in FIG. 2 when operated under certain conditions.

A more suitable recording technique may be implemented by lowering the voltage of the secondary electron collector 36 or raising the backplate voltage to insure that the equilibrium voltage for the target surface is determined by the instantaneous collector voltage independent of the original voltage. This eliminates the need for an erasing or priming operation. The general characteristics of the "effective" secondary emission curve when the collector voltage is less than the second crossover voltage is illustrated in FIG. 10. A voltage pattern may be established on the target surface by varying the collector voltage, or the backplate voltage, in accordance with the video information that is to be stored. In order to simplify the following analysis, it will be assumed that the collector voltage is varied by the input video information.

During the record interval, the secondary emission ratio may be approximated as a linear function of the target voltage as $$\delta_w=1-K_w(V_s-V_2) \text{ for } K_w>0 \qquad (30)$$

where $(-K_w)$ is slope of the curve in the neighborhood of $V_2$ in FIG. 10. The voltage $V_2$ corresponds to the collector voltage that produces a secondary emission ratio of unity and would be equal to the surface voltage $V_{sa}$ if the energies of the secondary electrons are insignificant where $V_{sa}$ is the surface voltage that corresponds to a unity secondary emission ratio.

where $\Delta V_2$

In most practical cases $V_{sa}$ will be equal to $V_2+\Delta V_2$ is a constant related to the average energy of the secondary electrons. In the following analysis it will be assumed that the secondary emission ratio may be expressed as $$\delta_w=1-K_w(V_s-V_{sa}) \qquad (31)$$

Following the steps used in the analysis of the reading operation, the charging current density during recording may be written as $$J_w=-\delta_w(V_s-V_{sa})-\sigma_t(V_s-V_b) \qquad (32)$$

where $$\delta_w=I_{bw}A^{-1}K_w \qquad (33)$$

and $I_{bw}$ is the beam current during recording.

The voltage of the target surface during the record interval may be written as $$V_s(t)=[V_r-(\sigma_w V_c+\sigma_t V_b)(\sigma_w+\sigma_t)^{-1}]\exp-(t/\tau_w)+(\sigma_w V_c+\sigma_t V_b)(\sigma_w+\sigma_t^{-1} \text{ for } 0<t<t_w \qquad (34)$$

where $$\tau_w=(\sigma_w+\sigma_t)\epsilon_1\epsilon_0/d \qquad (35)$$

$V_r$=target voltage at the beginning of the record operation $t_w$=recording interval for a particular picture element.

It has been assumed in this section that the target film can be characterized as a resistance film (i.e., $J_{do}=0$). The surface voltage will be approximately equal to the collector voltage if $t_w/\tau_w\approx 5$ and $\sigma_w/\sigma_t\gg 1$. In order to insure that the above conditions hold, it may be necessary to increase the beam current during recording.

While this method of recording does limit the resolution due to secondary electron redistribution, preliminary experiments have demonstrated that it is satisfactory for the requirements described above. The more conventional method of recording through the use of the photoconductive properties of $SbS_3$ have proven very satisfactory.

Next, consider in more detail some typical values for the tube parameters to be used. The parameters that will be considered are (1) beam current, (2) resistivity and dielectric constant for the target film, (3) film thickness, (4) output current, and (5) signal-to-noise ratio. In order to simplify the analysis it will be assumed in the subsequent discussion that $J_{do}=0$, $K_o=1$, and $V_{so}-V_o$.

Typical values of beam current in commercial vidicons are 0.1 to 10 $\mu$amp with a beam diameter of approximately one mil or less. This small beam diameter is achieved when the surface potential of the target is less than 10 volts. Since a typical minimum surface potential of the target in the present tube will be greater than 30 volts, it should be possible to achieve a beam diameter of less than one mil with a beam current much larger than that used in commercial vidicons. Throughout this consideration it will be assumed that the beam current is 5 $\mu$amp and that the beam diameter is 0.5 mil. If the constant, K, in Equation 11 is assumed to be (100 volts)$^{-1}$, the fictitious beam conductance becomes $$\sigma_b\approx 400 \text{ mho/m.}^2 \qquad (36)$$

From Equations 17, 19, and 22 it is apparent that the equilibrium reading operation requires that $$t_R(\sigma_b-\sigma_t)=t_F\sigma_t \qquad (37)$$

or $$\sigma_t\approx\sigma_b(t_R/t_F) \qquad (38)$$

since $t_F/t_R$ is approximately equal to the number of individual sites or picture elements (i.e., $t_F/t_R\approx 10^4$). If it is assumed that there are $4\times10^4$ picture elements, then $$\sigma_t\approx 10^{-2} \text{ mho/m.}^2 \qquad (39)$$

Thus, the volume resistivity of the film should satisfy $$\rho d\approx 100 \qquad (40)$$

A typical value of film thickness might be 2,500 A. This would require that the volume resistivity be equal to $$\rho\approx 4\times10^8 \text{ (ohm-m.)} \qquad (41)$$

The magnitude of the output current will be a function of the time constant that is associated with the reading operation which, in turn, is proportional to the dielectric constant of the target film. It will be assumed that the relative dielectric constant of the film is five. The surface potential during the read operation may be obtained from Equation 16 by utilizing Equation 38 as $$V_s(t)\approx(V_a-V_o)\exp(t/\tau b)-V_o \text{ for } 0<t<t_R \qquad (42)$$

The current, $I_o$, that flows in the target lead during the read operation due to a particular picture element may be obtained from Equation 42 as $$I_o=(A\epsilon_1\epsilon_0/d)dV_s/dt\approx I_bK(V_a-V_o)\exp(t/\tau_b) \text{ for } 0<t<t_R \qquad (43)$$

using the previously assumed values, the time constant associated with reading may be evaluated as $$\tau_b = 4.4\times 10^{-7}\ \text{sec.} \quad (44)$$

Assuming a frame rate of 60 frames per second and $4\times 10^4$ picture elements, the ratio of the reading time per picture element to the time constant, $\tau_b$, is $$t_R/\tau_b \approx 0.95 \quad (45)$$

The reading current, as obtained from Equation 43, will start at a value of $I_b K(V_a - V_o)$ and increase during the reading interval until it reaches a value of $$2.54 I_b K(V_a - V_o)$$

at the end of the reading interval. If $(V_a - V_o)$ were equal to 10 volts and K were equal to (100 volts)$^{-1}$, the average value of output current will be $$\langle I_o \rangle \approx 0.13 I_b = 1.3\ \mu\text{amp} \quad (46)$$

Since the leakage current through the target is quite large, it is more difficult to create a specified voltage pattern during the writing operation by an electron beam in the device of FIG. 2. An examination of Equation 34 reveals that the electron beam will satisfactorily impress the voltage pattern when the following conditions are satisfied:

$$t_w/\tau_w \gg 1 \quad (47)$$

$$\sigma_w/\sigma_t \gg 1 \quad (48)$$

In a typical mode of operation, the recording interval will be at least twice the reading interval. It is assumed that the beam current during writing is equal to twice the beam current during reading, that K equals $K_w$, and that the ratio of $t_w$ to $\tau_w$ may be obtained from Equation 45 as $t_w/\tau_w \approx 3.8$. Similarly, the ratio $\sigma_w/\sigma_t$ may be obtained with the aid of Equation 38 as $\sigma_w/\sigma_t \approx 8\times 10^4$.

Therefore, if the beam current is increased to 20 $\mu$amp during recording and the duration of the write frame is $1/30$ sec., the surface voltage of the target will be equal to the collector voltage to within $(V_r - V_c)/30$, where $(V_r - V_c)$ represents a residual signal and is equal to the change in information from frame to frame. If the ratio of $t_w/\tau_w$ were increased to 4.6, the residual signal would be reduced to $(V_r - V_c)/100$.

There are two dominant sources of noise in a frame repeating tube, viz., shot noise in the electron stream and thermal noise in the load resistor. An estimate of the signal-to-noise (S/N) ratio may be obtained by assuming that the output current may be approximated as $$I_o \approx \langle I_l \rangle + 0.1 I_b \cos \omega t \quad (49)$$

where $\langle I_l \rangle$=leakage current$\approx$1 $\mu$amp
$I_b$=beam current$\approx$10 $\mu$amp The RMS thermal noise voltage developed across the load resistor would be $$E_{nt} = (4kTBR)^{1/2} \quad (50)$$

where $k$=Boltzmann's constant=$1.38\times 10^{-23}$ (joule/T.°)
$T$=absolute temperature$\approx$300° T.
$R$=load resistance
$B$=bandwidth of output signal$\approx$1 mc.

The RMS shot noise voltage developed across the load resistor would be $$E_{ns} = (2e\langle I_o \rangle B)^{1/2} R \quad (51)$$

where $e$=electronic charge=$1.6\times 10^{-14}$ col.

Thus, the S/N ratio may be approximated as $$S/N = \frac{(0.1 I_b)^2 R}{8kTB + 4e\langle I_o \rangle BR} \quad (52)$$

Utilizing the previously assumed values, Equation 52 becomes $$S/N \approx \frac{R\times 10^{-12}}{3.3\times 10^{-14} + 6.4R\times 10^{-19}} \quad (53)$$

Thus, the S/N ratio will be limited by thermal noise if $R < 10^5$ ohms and will be limted by shot noise if $R > 10^6$ ohms. A typical value of resistance of $10^4$ ohms would provide a S/N ratio of approximately 55 db.

The tube parameters that will provide perfect equilibrium condition have been given above. In any practical true, the value of these parameters may vary over the target surface. Next, consider the tolerances on the following parameters: secondary emission, film thickness, and film resistivity. Since the effects of varying these parameters is cumulative when the surface is read several times, the permissible tolerances are decreased as the number of read-outs of each stored frame is increased. For purposes of illustration, the tolerances will be evaluated for the cases in which each stored frame is read out twice and each frame is read out four times.

When the tube parameters are varied from their optimum values, the output current from a particular picture element changes each time a stored frame is read out. In order to simplify the analysis, the effect of varying each tube parameter from its optimum value will be evaluated separately. It will be arbitrarily assumed that the maximum allowed variation in output signal from the first frame to the last frame is 10 percent.

The relationship between the secondary emission ratio and the bombarding energy is given to Equation 8 and is characterized by two constants, $V_o$ and K when $V_{so}$ equals $V_o$. The effect of a small variation in $V_o$ will be evaluated first. Utilizing the derived relationship that $\sigma_b >> \sigma_t$, Equation 16 and 18 may be combined to yield $$\begin{aligned} V_s(t_R + t_F) \approx V_a \exp\,[t_T/\tau_b - t_F/\tau_t] \\ - V_o\{\exp\,[t_R/\tau_b - t_F/\tau_t] - \exp - (t_F/\tau_t)\} \quad (54) \\ + V_b\{1 - \exp - (T_F/\tau_t)\} \end{aligned}$$

where $t_R + t_F$ has been approximated as $t_F$, and $V_a$ is the target voltage just before the first reading operation. The effects of a small variation in $V_o$ form its optimum value of $V_b$ may be obtained from Equation 54 by replacing $V_o$ with $V_o + \Delta V_o$. The voltage of the target surface after $n$ reading operations, or $n$ frames, would be $$\begin{aligned} V_s,\Delta V_o(nt_T + nt_F) \approx V_a - n(\Delta V_o) \\ \{1 - \exp - (t_F/\tau_t)\} \quad (55) \end{aligned}$$

Utilizing Equations 43 and 55 the output current may be evaluated $$\begin{aligned} I_o(nt_R + nt_F) \approx I_b K(V_o) \exp\,(t/\tau_b) \\ - \Delta V_o I_b K[1 + (n-1)\{1 - \exp - (t_F/\tau_t)\}] \exp \quad (56) \\ (t/\tau_b)\ \text{for}\ n(t_R + t_F) < t < (n+1)t_R + nt_F \end{aligned}$$

The fractional change in output current may be evaluated as $$\begin{aligned} \Delta I_o/I_o \approx -[(\Delta V_o)/(V_a - V_o)][1 \\ + (n-1)\{1 - \exp - (t_F/\tau_t)\}] \quad (57) \end{aligned}$$

It is apparent from Equation 57 that for a given $\Delta V_o$ the fractional change in output current will be minimized by decreasing the ratio of $t_F/\tau_t$ and increasing the value of $V_a - V_o$. Utilizing the previously derived value for $t_F/\tau_t$ (e.g., see Equations 38 and 45), Equation 57 becomes $$\Delta I_o/I_o \approx [\Delta V_o)/V_a - V_o][1 + 0.39(n-1)] \quad (58)$$

With the arbitrary restriction that the output signal be constant to within 10 percent for $n=2$ and $n=4$, then the maximum allowed values for $\Delta V_o$ are $$\Delta V_o < .072|V_a - V_o| \text{ for } n=2 \quad (59)$$

$$\Delta V_o < .046|V_a - V_o| \text{ for } n=4 \quad (60)$$

Since the order of magnitude for $|V_a - V_o|$ is ten, $\Delta V_o$ should be constant to within several millivolts.

The effects of small variations in the other parameter that characterizes the secondary emission ratio will be evaluated in a similar manner. The voltage of the target surface after $n$ reading operations would be $$V_{s,\Delta K}(nt_R + nt_F) \approx V_a + n(\Delta K/K)[V_a - V_o][t_R/\tau_b] \quad (61)$$

where $\Delta K$ represents the amount that K deviates from its optimum value. The fractional change in output current at the beginning of the $n$th reading operation may be evaluated from Equations 43 and 61 as $$\Delta_o/I_o \approx (\Delta K/K)[1+(n-1)(t_R/\tau_b)] \quad (62)$$

Utilizing the previously assumed values, the permitted variations in K are obtained as $$\Delta K/K \approx .05 \text{ for } n=2 \quad (63)$$

$$\Delta K/K \approx .025 \text{ for } n=4 \quad (64)$$

A small variation in the film thickness will change the time constant associated with the electron beam during reading by the amount $$\Delta\tau_b \approx (\Delta d/d)\tau_b \quad (65)$$

Thus, the target voltage after $n$ reading operations is $$V_{s,\Delta d}(nt_R + nt_F) \approx V_a + n(\Delta d/d)(T_R/\tau_b)(V_a - V_o) \quad (66)$$

The fractional change in the output current at the beginning of the $n$th reading operation may be evaluated from 36 and 56 as $$\Delta I_o/I_o \approx (n-1)(\Delta d/d)(t_R/\tau_b) \quad (67)$$

Utilizing the previously assumed values, the permitted variations in film thickness are $$\Delta d/d \approx 0.10 \text{ for } n=2 \quad (68)$$

$$\Delta d/d \approx 0.035 \text{ for } n=4 \quad (69)$$

A small change in film resistivity will change the time constant associated with the target by the amount $$\Delta\tau_t/\tau_t \approx \Delta\rho/\rho \quad (70)$$

Thus, the target voltage after $n$ reading operations is $$V_{s,\Delta\rho}(nt_R + nt_F) \approx V_a + n(\Delta\rho/\rho)(t_{Ert})(V_a - V_o) \quad (71)$$

The fractional change in output current at the beginning of the $n$th reading operation may be evaluated from Equations 43 and 71 as $$\Delta I_o/I_o \approx (n-1)(\Delta\rho/\rho)(t_F/\tau_t) \quad (72)$$

Utilizing the previously assumed values, the permitted variations in film resistivity are $$\Delta\rho/\rho \approx 0.1 \text{ for } n=2 \quad (73)$$

$$\Delta\rho/\rho \approx 0.035 \text{ for } n=4 \quad (74)$$

In most storage tubes that use stored charge on a dielectric surface for memory, the equilibrium voltage for the dielectric surface is established by the secondary electron collector voltage or by cathode voltage. If the collector voltage is used as the equilibrium voltage, severe crosstalk between storage sites may result from secondary electron redistribution. If the cathode voltage is used as the equilibrium voltage three deleterious effects result as the landing energy of the beam approaches zero. (1) The beam size is increased. (2) The ability of the electron beam to charge or discharge the target approaches zero. (3) The collimating lens tolerances become very tight.

The tube described produces an equilibrium voltage near the first crossover for the secondary emission ratio (i.e., the lowest bombarding voltage that produces a secondary emission ratio equal to unity) without requiring any redistribution of secondary electrons. Since the first crossover voltage is between 50 to 100 volts, this tube does not suffer from any of the defects outlined above.

Typical parameters for a storage tube which uses this equilibrium reading technique have been given above. The tolerances on the uniformity of the storage surface will be the same order of magnitude as the tolerances required in the displayed video. That is, if two read-outs are required and a variation of 10 percent in signal amplitude is permitted between read-out amplitudes, the parameters that characerize the storage surface (i.e., resistance, thickness, and secondary emission ratio) should be uniform to within approximately 10 percent over the surface. Furthermore, the permissible variation is inversely proportional to the number of read-outs required. If the insulating film that provides the storage surface is a photoconductor, it may be possible to determine the optimum resistivity by evaluating the tube performance when storage surface is illuminated with different levels of light.

From the foregoing, it is clear that numerous modifications and embodiments other than those described may be made without departing from the spirit and scope of the invention.

What is claimed is:

1. In combination:

a storage film in contact over a first surface with a conductive backplate;

means for forming and projecting a beam of electrons toward a target surface of the film;

means for deflecting the beam and causing it to scan periodically the target surface in a line and frame sequence;

the film being sufficiently insulative to permit the formation of a voltage pattern of potential differences along the target surface thereof, but being sufficiently conductive to permit leakage currents to flow from the conductive backplate to the target surface;

means for establishing a voltage pattern on the target surface defined by different first voltages on different incremental areas of the target surface, said voltage pattern being indicative of an input signal;

means for detecting differences of secondary emission from the target surface as the beam scans it, thereby recovering a signal representative of the stored voltage pattern and of the input signal;

the time constants of the storage film and the electron beam being so related to the line and frame rate of the electron beam scan that in the interim between successive impingements of the beam on each incremental target surface area sufficient leakage current flows from the first surface of the film to the target surface to recharge and reinforce the voltage of the incremental area substantially to its first voltage;

the minimum spatial wavelength of the target voltage pattern being larger than the thickness of the film, whereby the resistance between voltage differences on the target surface is larger than the resistance between the first surface and the target surface of the storage film.

2. The combination of claim 1 wherein:

the electron beam and storage film time constanst $\tau_b$ and $\tau_t$ substantially conform to the relationship, $$\frac{\tau_b}{\tau_t} = \frac{t_R}{t_F}$$

where $t_R$ is the time during which an incremental area of the film is exposed to the beam during each frame, and $t_F$ is the time during each frame at which the incremental area is not exposed to the beam.

3. The combination of claim 1 wherein:

the storage film is made of photoconductive material;

the conductive backplate is substantially optically transparent;

and further comprising a cathode ray display tube for forming images at a first frame rate;
means for projecting said images to the conductive backplate, thereby forming on the target surface voltage patterns indicative of the images;
and wherein the frame rate of the beam that scans the target surface is a multiple of the first frame rate, whereby the detecting means comprises means for detecting signals representative of a plurality of images for each image projected onto the storage film.

4. The combination of claim 2 wherein:
the electron beam current is approximately 10 microamperes;
the recovered signal is a current of approximately 1 microampere;
the storage film thickness is approximately 2500 angstroms;
and the storage film resistivity is approximately $4\times10^{10}$ ohm-centimeters.

5. The combination of claim 4 wherein:
the storage film is doped antimony trisulfide.

6. The combination of claim 4 wherein:
the storage film is doped cadmium sulfide.

7. In combination:
first and second cathode ray storage tubes;
each storage tube including a storage film in contact over the first surface thereof with a conductive backplate, means for forming and projecting a beam of electrons toward a target surface of the film, means for deflecting the beam and causing it to scan periodically the target surface in a line and frame sequence, the film being sufficiently insulative to permit the formation of a voltage pattern of potential differences along the target surface thereof but being sufficiently conductive to permit leakage currents to flow from the conductive backplate to the target surface, means for establishing a voltage pattern on the target surface defined by different first voltages on different incremental areas of the target surface which are indicative of an input signal, means for detecting differences of secondary emission from the target surface as the beam scans it, thereby recovering a signal representative of the input signal, the time constants of the storage film and the electron beam being so related to the line and frame rate of the electron beam that in the interim between successive impingements of the beam on each incremental target surface area sufficient leakage current flows from the first surface of the film to the target surface to recharge and reinforce the voltage of the incremental area substantially to its first voltage, the minimal spatial wavelength of the target voltage pattern being larger than the thickness of the film, whereby the target surface is sufficiently resistive to maintain the voltage pattern thereon;
an input circuit and an output circuit each connected through a switch to a different storage tube;
means for periodically switching the connections of the input and output circuits to the two tubes;
the input circuit including means for modulating the beam in accordance with an input signal and for driving the deflecting means at a first frame rate;
the output circuit including means for driving the deflecting means at a second frame rate and for detecting differences of secondary emission from the target surface as the beam scans it, thereby recovering a signal representative of the input signal;
the second frame rate being a multiple of the first frame rate.

8. A cathode ray storage tube comprising:
a thin storage film in intimate contact with a conductive backplate;
means for impressing on the storage film a voltage pattern representative of a transmitted television image;
means for forming and projecting a beam of electrons;
means for deflecting the beam and causing it to scan periodically the target surface of the thin film in a line and frame sequence;
the electron beam and the film respectively having time constants $\tau_b$ and $\tau_t$, the ratio of which is substantially given by $$\frac{\tau_b}{\tau_t}=\frac{t_R}{t_F}$$

where $t_R$ is the time during which a given area of the film is exposed to the beam during each frame and $t_F$ is the time during each frame at which the given area is not exposed to the beam.

9. The cathode ray tube of claim 8 wherein:
the resistance of the thin film to leakage currents is substantially linear with respect to the various voltages impressed across the film;
and the thin film secondary emission ratio versus electron beam voltage is substantially linear over a usable voltage range;
the average voltage of said voltage pattern on the target surface is approximately equal to the voltage at the center of the linear portion of the secondary emission versus electron beam voltage characteristic of the film;
and further comprising means for biasing the conductive backplate at a voltage substantially equal to the voltage on the secondary emission ratio versus electron beam voltage characteristic at which a straight line tangent to the linear part of the characteristic intersects a straight line at which the secondary emission ratio equals 1.

10. The cathode ray tube of claim 8 wherein:
the resistance of the thin film to leakage current is substantially nonlinear with respect to certain voltages impressed across the film;
the secondary emission ratio of the film is less than 1;
and further comprising means for biasing the conductive backplate at a voltage $V_b'$ substantially given by the relationship $$V_b'=V_{so}-\frac{J_{bo}}{\sigma_b}-\frac{J_{do}}{\sigma_t}$$

where $V_{so}$ is the center of the dynamic range of the target voltage, $\sigma_b$ is the electron beam conductance per unit area, $\sigma_t$ is the film conductance per unit area, $J_{bo}$ is the electron beam current density factor, and $J_{do}$ is the extrapolated leakage current density factor.

11. The cathode ray tube of claim 8 wherein:
the resistance of the thin film to leakage currents is substantially nonlinear wtih respect to certain voltages impressed across the film;
the secondary emission ratio of the film is greater than 1, and further comprising means for biasing the conductive backplate at a voltage $V_b''$ substantially given by the relationship $$V_b''=V_{so}-\frac{J_{bo}}{\sigma_b}+\frac{J_{do}}{\sigma_t}$$

where $V_{so}$ is the center of the dynamic range of the target voltage, $\sigma_b$ is the electron beam conductance per unit area, $\sigma_t$ is the film conductance per unit area, $J_{bo}$ is the electron beam current density factor, $J_{do}$ is the extrapolated leakage current density factor.

References Cited

UNITED STATES PATENTS 2,943,231 6/1960 Boulet et al. ---------- 315—12

RODNEY D. BENNETT, *Primary Examiner.*

C. E. WANDS, *Assistant Examiner.*